Oct. 24, 1967 I. L. FISCHER ETAL 3,349,246

COMPACT SUB-MINIATURE OPTICAL PICKUP ASSEMBLY

Filed April 27, 1964

INVENTORS
BERNARD SPIEKER
ISRAEL L. FISCHER
WALTER W. LEE
THOMAS J. MELORO

BY Constantine A. Michalos
ATTORNEY 3,349,246
COMPACT SUB-MINIATURE OPTICAL PICKUP ASSEMBLY Israel L. Fischer, Harrington Park, Walter W. Lee, Allendale, Thomas J. Meloro, Jersey City, and Bernard Spieker, New Milford, N.J., assignors to The Bendix Corporation, Teterboro, N.J., a corporation of Delaware Filed Apr. 27, 1964, Ser. No. 362,836
3 Claims. (Cl. 250—239)

ABSTRACT OF THE DISCLOSURE

A compact sub-miniature optical pickup assembly in which longitudinally extending conductors are positioned in spaced relation around an inner surface of an elongated cylinder with electronic elements of a transistor amplifier being positioned in a longitudinal relation in spaces provided between the conductors and transversely compacted with the longitudinally extending conductors within the cylinder.

This invention relates to optical sensing devices and particularly to the packaging of a sub-miniature optical pick-up with electro-optical transducer and amplifier.

More specifically, the invention provides for an implementation of an optical scanning device as shown in the drawings in which a miniature optical sensor is used which is particularly suitable for use in an optical memory system having high density, large capacity, and permanent storage for use in outer space digital computing control systems.

Therefore, it is an object of this invention to provide a sensing device that is subminiature in size for compressing the overall size of the optical memory system by applying the techniques of microdesign.

Another object of the present invention is to provide an optical pick-up sensor having a high packaging efficiency within its casing by providing a unique arrangement of the elements comprising the sensor.

Another object of the present invention is to provide a subminiature optical pick-up device utilized in optically sensing microphotographic bits of information and to amplify this information for use within a computer.

An additional object of this invention is to provide a hermetically sealed high density improved sensing device that has a minimum number of parts that are so constructed that they can be easily assembled within a casing of a minimum diameter.

A further object of this invention is to provide a reduced lead length between the detector and preamplifier, thus reducing noise pick-up.

These and other objects and features of the invention are pointed out in the following description in terms of the embodiment thereof which are shown in the accompanying drawings. It is to be understood, however, that the drawings are for the purpose of illustration only and are not a definition of the limits of the invention, reference being had to the appended claims for this purpose.

Figures 1, 2, 3, 4, 5, 6, 7, 8:
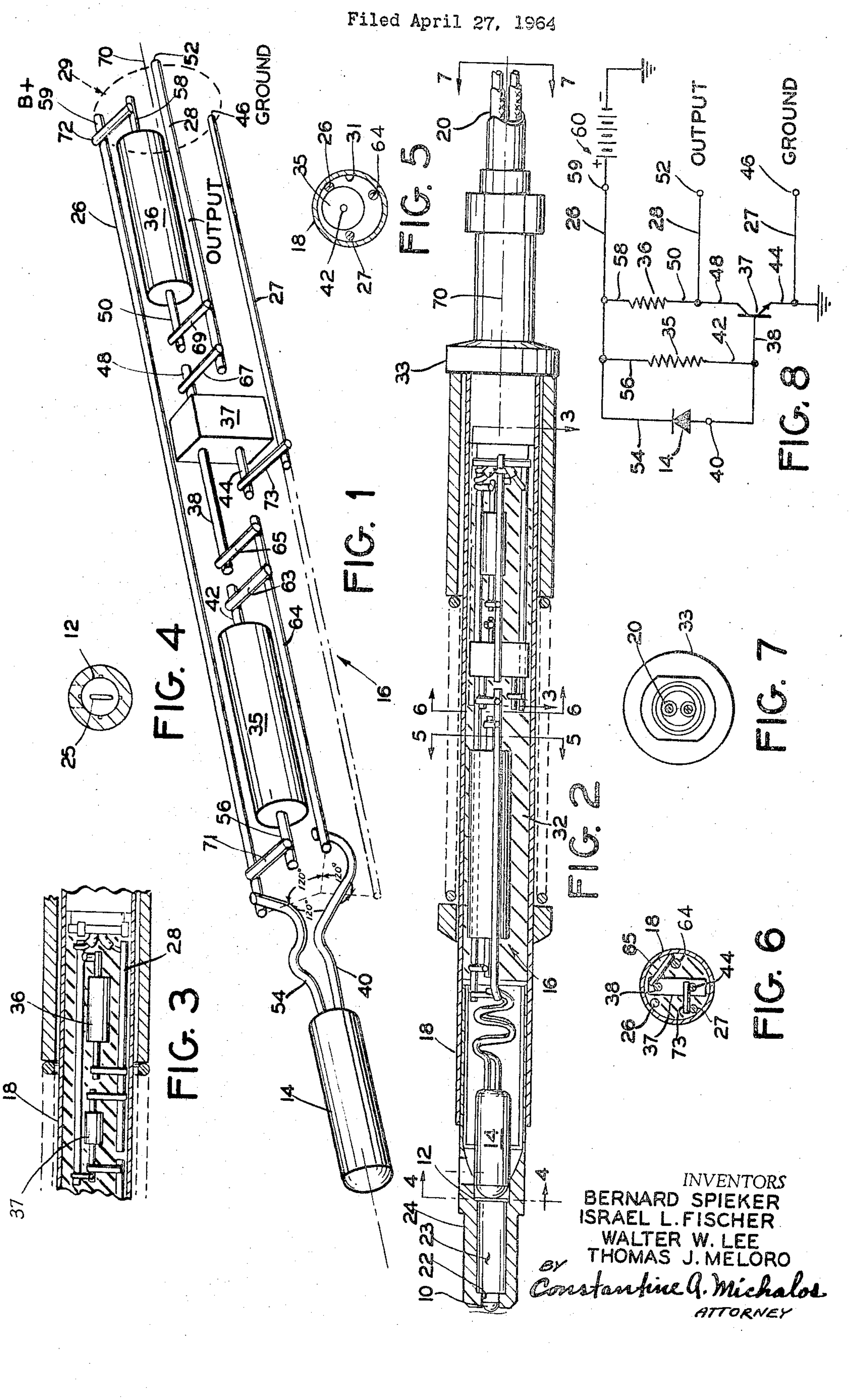
FIGURE 1 shows a perspective view of a part of the miniature optical sensor in accordance with a preferred embodiment of this invention.
FIGURE 2 is a side view partly in section of the invention in accordance with the preferred embodiment shown in FIGURE 1, as assembled completely within a casing.
FIGURE 3 is a fragmentary plan sectional view of the invention taken along line 3—3 of FIGURE 2.
FIGURE 4 is a sectional view of the invention taken along line 4—4 of FIGURE 2.
FIGURE 5 is a sectional view of the invention taken along line 5—5 of FIGURE 2.
FIGURE 6 is a sectional view of the invention taken along line 6—6 of FIGURE 2.
FIGURE 7 is an end view of the invention taken along line 7—7 of FIGURE 2.
FIGURE 8 is an electrical circuit of the invention shown in FIGURES 1 and 2.

Referring now to the drawings; it is illustrated that the present invention provides a readout assembly comprising a clear sapphire plano-convex lens 10 approximately .5 mm. to 1.0 mm. in diameter, an optical stop plate 12, a detector or photodetector such as a photodiode 14, a preamplifier 16 of unique construction and a supporting cylinder or case 18 containing the herein mentioned elements.

The preamplifier 16 and photodiode or detector 14 are packaged together in order to reduce lead length between the detector 14 and preamplifier 16, thus further reducing noise and pick-up. Coaxial output cables 20 are used for interconnecting the output of the preamplifier to the input of the high gain amplifier (not shown) and for connecting the B+ point of the preamplifier 16 to the B+ point of the high gain amplifier (not shown). The coaxial shield is grounded only at one end.

Clear sapphire has been found to have the required optical and mechanical properties for the material used for the lens 10. The lens 10 is pressed into an opening 22 within a light signal passage 23 of a lens mounting tube 24 so that the convex side faces the subject.

The optical stop 12 is located at the image plane. The stop 12 contains an aperture 25 as best shown in FIGURE 4. The aperture 25 in this stop 12 is a rectangular opening the size, shape, and orientation of the binary information bit inscribed on the subject, in this case, a glass drum as outlined in the copending application Ser. No. 336,487, filed Jan. 8, 1964, by Lee et al. and assigned to The Bendix Corporation, the same assignee as the present invention.

In contact with the rear face of the stop 12 is the photodetector 14 which produces an electrical signal proportionate to the amount of light impinging on it through the aperture 25 as magnified by the lens 10.

The electronic signal is amplified by the preamplifier 16. As herein more fully described, the preamplifier 16 is electronically interconnected to three parallel conductors 26, 27, and 28 spaced at 120° intervals on a base circle 29 which will permit insertions of the whole unit within the casing 18 having a .140 inch diameter hole 31.

The electrical components are welded to the appropriate conductors and the assembly is encapsuled in a suitable compound, such as epoxy 32 shown in shaded lines in the drawing. The preamplifier 16 is completed by cutting the conductor in various places as required by an electrical design, shown in FIGURE 8.

It should be noted that the sensing device includes the preamplifier 16 which is encased by the epoxy 32 within the casing 18 and the lens 10 and stop 12, which are positioned in the lens mounting tube 24, which is pressed into the amplifier case 18 described before and within a rear mounting stud 33, which forms a connecting point with the output cables 20.

While a light signal responsive network may be utilized in the preamplifier 16 of a type such as disclosed and claimed in U.S. Patent No. 3,247,388, granted Apr. 19, 1966 to Israel L. Fischer, Richard Wolfson and Edward Kresch, and assigned to The Bendix Corporation, the network of the preamplifier 16 is shown herein as of a type such as disclosed and claimed in a copending U.S. application Ser. No. 364,212, filed May 1, 1964 by Israel L. Fischer, and assigned to The Bendix Corporation. Thus the network of the preamplifier 16, as shown by the circuit diagram of FIGURE 8, is of the last mentioned type and includes a high gain tuned amplifier having two resistors 35 and 36 electrically connected in parallel with the photodetector 14. The resistor 35 provides an input impedance to a transistor 37 while the resistor 36 provides an output impedance for the transistor 37. The electronic transistor 37, as is further shown by FIGURES 1 and 2, interwoven with the electrical circuit so that its base 38 is connected through conductors 64 and 65 to electrode 40 of the photodetector 14 while one electrode 42 of the resistor 35 is connected through a conductor 63 and the conductors 64 and 65 to the base 38. Another electrode 44 leading from the emitter of the transistor 37 is connected to the ground terminal 46 of the system and another electrode 48 leading to the collector of the transistor 37 is connected through conductors 67, 28 and 69 to one electrode 50 of the output resistor 36 and to the output terminal 52. Another electrode 54 of the photodetector 14 is connected through conductors 26 and 71 to the other electrode 56 of the input resistor 35, and through conductors 26 and 72 to the electrode 58 of the output resistor 36, and to the plus terminal of an electrical potential 59, such as a plus terminal B+ of a battery or source of electrical energy 60 having an opposite grounded negative terminal.

It should be noted that the primary feature of this invention is the unique arrangement of the longitudinally extending conductors 26, 27, 28, and 64, as shown in FIGURE 1, which are spaced in 120° intervals on the base circle 29 for interconnecting the electrodes of the photodetector 14, the resistors 35 and 36 and the transistor 37.

That is, the conductor 26 located at one diametrical point of the base circle 29 and connected to the electrode 54 of the detector 14 extends longitudinally and parallel to an axis 70 of the overall sensing device to contact the electrode 56 of the resistor 35 and the electrode 58 of the resistor 36, by bridging conductors 71 and 72, respectively, as best shown in FIGURE 1. The conductor 27 is located 120° from the conductor 26, around the base circle 29 and is connected to the emitter electrode 44 of the transistor 37 by a bridging conductor 73. The conductor 27 then extends longitudinally parallel to the axis 70 to connect to ground 46. The third conductor 28 is placed 120° from conductor 27 around the base circle 29 while the other conductor 64, is axially aligned to the conductor 28 and connects the other electrode 40 of the photodetector 14 and the electrode 42 of the resistor 35 with the base electrode 38 of the transistor 37 by bridging conductors 63 and 65, respectively. The collector conductor 28 connects the electrode 48 of the transistor 37 to the electrode 50 of the resistor 36 through bridging conductors 67 and 69, respectively. The conductor 28 is connected externally to the output 52 of the overall sensing device, conductor 27 is connected to the ground 46 and the conductor 26 is connected externally to the plus terminal 59 of the battery 60.

It should be noted that the bridging conductors may be eliminated and the electrodes of the electronic elements may be bent to contact the respective conductors 26, 27, 28, and 64.

Referring to FIGURE 5, it should be also noted that the maximum inside diameter of the supporting case 18 need be the sum of the resistor 35 diameter and the diameter of the conductors with the thickness of the insulating material if the conductors are not insulated. If the conductors are insulated at the point of contact with the case 18, the overall sensor assembly may be assembled in a casing of a still smaller diameter.

Therefore, the overall arrangement and interconnections of the elements of the sensing device with their electrodes and conductors provide for a subminiature optical sensing device having maximum density with a substantial decrease in both volume and overall size, which is an important feature in meeting present aerospace requirements.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An optical sensing device comprising an elongated cylinder having an opening at an end of said cylinder, a lens mounted within said opening, a photodetector and a transistor mounted within said cylinder, a plurality of conductors extending longitudinally in said cylinder, means electrically connecting said photodetector and a source of electrical energy through said conductors to said transistor for causing the transistor to produce electrical output signals in response to light signals directed to said photodetector through said lens, said longitudinal conductors being positioned in spaced relation within said cylinder, and said connecting means including resistor means extending longitudinally within said cylinder and in a longitudinally spaced relation to said transistor and photodetector, and said transistor and resistor means being interposed between said conductors in a space therebetween, said resistor means rendering one pair of said longitudinal conductors effective to electrically connect said photodetector and transistor and another pair of said conductors effective for transmitting said electrical output signals from said transistor, and said longitudinal conductors being transversely compacted with said resistor means and transistor within said cylinder.

2. An optical sensing device as defined in claim 1 in which said resistor means includes an input impedance connected across opposite terminals of the photodetector, and an output impedance connected between an output terminal of the transistor and the source of electrical energy.

3. An optical sensing device comprising an elongated casing, a lens disposed at one end of said casing operable for receiving and magnifying light signals therethrough, a stop transversely extending to said casing and positioned in said casing in spaced relation to said lens, said stop having an opening defining an aperture of a predetermined configuration for shaping said light signals applied through said lens, a photodetector positioned in said casing adjacent to said stop and operable to receive said light signals applied by said lens through the aperture to convert said light signals to electrical input signals, a transistor positioned in said casing intermediate opposite ends thereof and extending transverse said casing, said transistor having a base, emitter and collector elements, a first pair of conductors extending longitudinally in spaced relation in said casing and operably connected to opposite terminals of said photodetector, a first electrode leading from the base element, a second electrode leading from one of the other of said transistor elements, and a third electrode leading from the other of said other elements, said electrodes extending outwardly from said transistor, conductor means interposed between the first electrode of said transistor and one of the first pair of longitudinally extending conductors for electrically interconnecting said one conductor to the first electrode leading to the base element of said transistor, another of said first pair of conductors extending longitudinally through the other end of said casing for connection to one terminal of a source of electrical energy, a first resistor providing an input impedance electrically connected between the first pair of longitudinally extending conductors, said first resistor extending longitudinally in the casing in a space between the first pair of conductors and said photodetector and transistor, a second pair of conductors extending longitudinally in said casing in spaced relation one to the other and to said first pair of longitudinally extending conductors, one of said second pair of conductors leading from an opposite terminal of said source of electrical energy, conductor means connecting said one conductor of said second pair of conductors to the second electrode of the transistor, other conductor means connecting another of said second pair of conductors to the third electrode of the transistor, a second resistor providing an output impedance electrically connected between the other of the first pair of longitudinally extending conductors and said other of the second pair of conductors, said second resistor extending longitudinally in the casing in a space between the second pair of conductors and the other of said first pair of conductors and between the transistor and said other end of the casing, and said second pair of longitudinally extending conductors applying from said transistor an output signal corresponding to an amplification of an electrical input signal applied across the first pair of longitudinally extending conductors by the photodetector in response to the light signals received thereby.

References Cited

UNITED STATES PATENTS

| | | | |
|---|---|---|---|
| 2,235,896 | 3/1941 | Matthews | 174—52 X |
| 2,590,821 | 3/1952 | Kiser | 174—50.54 X |
| 2,636,128 | 4/1953 | Vance | 250—239 X |
| 2,737,598 | 3/1956 | Lewis et al. | |
| 2,817,021 | 12/1957 | Williams et al. | |
| 2,903,690 | 9/1959 | Slack. | |
| 2,912,593 | 11/1959 | Deuth. | |
| 2,912,625 | 11/1959 | Benson | 174—52 X |
| 3,012,150 | 12/1961 | Thomson et al. | |
| 3,031,655 | 4/1962 | Temple et al. | 174—52 |
| 3,056,332 | 10/1962 | Beregowitz | 250—239 X |
| 3,085,179 | 4/1963 | Keeran. | |
| 3,112,422 | 11/1963 | Schneider. | |
| 3,153,149 | 10/1964 | Finigian | 250—239 X |

RALPH G. NILSON, *Primary Examiner.*

J. D. WALL, *Assistant Examiner.*